(No Model.)

P. KEARNS.
LEVER ATTACHMENT FOR HAND SHEARS.

No. 315,295. Patented Apr. 7, 1885.

on line x-x

WITNESSES

INVENTOR
Patrick Kearns.
By Phil. T. Dodge,
Attorney

United States Patent Office.

PATRICK KEARNS, OF PHILADELPHIA, PENNSYLVANIA.

LEVER ATTACHMENT FOR HAND-SHEARS.

SPECIFICATION forming part of Letters Patent No. 315,295, dated April 7, 1885.

Application filed January 27, 1885. (No model.)

*To all whom it may concern:*

Be it known that I, PATRICK KEARNS, of Philadelphia, in the county of Philadelphia and State of Pennsylvania, have invented certain Improvements in Lever Attachments for Hand-Shears, of which the following is a specification.

The aim of my invention is to provide a cheap and simple attachment for the shears used by tinners and other workers in metal, commonly denominated "bench - shears," whereby they may operate with increased leverage to adapt them for heavy work.

To this end it consists in a hand-lever provided with clips or fastening devices, by which it may be connected either temporarily or permanently to an ordinary pair of shears without changing or altering the latter.

Figure 1:
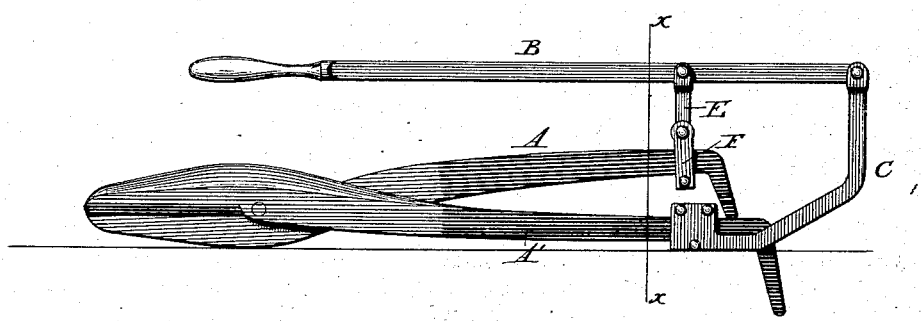
Figure 2:
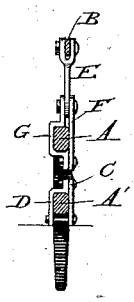

In the accompanying drawings, Figure 1 represents a side elevation of a pair of shears provided with my attachment; Fig. 2, a cross-section on the line *x x*.

A A' represent the two arms of an ordinary pair of shears.

B represents a hand-lever pivoted at one end to an angular arm, C, which is turned backward beneath the lever and provided at its extremity with a clip-plate, D, attached thereto by thumb-screws or other appropriate fastenings, and adapted to clasp firmly one arm of the shears.

E represents a link pivoted to the hand-lever at any suitable point in its length, and also pivoted at its opposite end to a plate, F, provided with a clip, G, attached by thumb-screws or other fastenings, and adapted to embrace the second arm of the shears.

It will be observed that the hand-lever extends backward above the shears to a point near their jaws, and that by raising and lowering the end of the lever the shears may be caused to operate in the ordinary manner, but with greatly-increased power.

The shears will ordinarily be maintained in position upon a bench in the manner in which such shears are commonly operated. When thus arranged, their operation, by means of the hand-lever, is advantageous, not only because of the increased leverage, but because the operator is permitted to stand with both hands near the jaws of the shears, so that he may the more readily and accurately manipulate the metal upon which the shears operate.

It is to be noted that my device may be applied to ordinary shears without the necessity of drilling, cutting, or otherwise fitting them for its application; that the attachment may be quickly disconnected when it is required to operate the shears in the ordinary manner, and that the point of attachment to the shear-arms may be varied, so as to increase or diminish the leverage.

It is manifest that the clips may be varied in form in many respects which will suggest themselves to the ordinary mechanic, the details of their construction being immaterial, provided they are adapted for convenient application to the shears.

Having thus described my invention, what I claim is—

1. As a new article of manufacture, a lever attachment for application to ordinary tinner's shears, the same consisting of a hand-lever and two clips pivotally attached thereto, said clips adapted, as described and shown, to be applied to the shear-arms without drilling or altering the latter.

2. The improved attachment for metal-working shears, consisting of the hand-lever, the angular arm pivoted thereto, and provided with a clip at one end, the link E, and the clip G, pivoted to said link.

3. A hand-lever provided with two adjustable clasps or clips adapted to encircle the arms of an ordinary pair of shears, substantially as described and shown.

In testimony whereof I hereunto set my hand, this 9th day of January, 1885, in the presence of two attesting witnesses.

PATRICK KEARNS.

Witnesses:
GEO. DEACON,
WM. K. SHRYOCK.